(12) United States Patent
Murao et al.

(10) Patent No.: US 6,406,299 B1
(45) Date of Patent: Jun. 18, 2002

(54) 6-DEGREE-OF-FREEDOM TRAVELLING SYSTEM

(75) Inventors: Yoshio Murao; Kenji Koubuchi, both of Osaka; Satoshi Tadokoro, Kobe, all of (JP)

(73) Assignee: Taiyo Ltd., Osaka (JP)

( * ) Notice: Subject to any disclaimer, the term of this patent is extended or adjusted under 35 U.S.C. 154(b) by 13 days.

(21) Appl. No.: 09/603,538

(22) Filed: Jun. 26, 2000

(30) Foreign Application Priority Data

Jun. 25, 1999 (JP) ............................................ 11-179430

(51) Int. Cl.[7] ............................................. G09B 19/16
(52) U.S. Cl. ........................ 434/29; 472/130; 472/135; 472/59; 434/30; 434/55
(58) Field of Search ................... 434/29–71; 472/1–47, 472/59, 75–76, 78–83, 130, 135

(56) References Cited

U.S. PATENT DOCUMENTS

| | | | | |
|---|---|---|---|---|
| 2,344,454 A | * | 3/1944 | Plotner | |
| 3,597,857 A | * | 8/1971 | Akister | |
| 3,890,722 A | * | 6/1975 | Nunez | |
| 4,164,080 A | * | 8/1979 | Kosydar | |
| 5,695,407 A | * | 12/1997 | Dunn | 472/135 |
| 5,860,663 A | * | 1/1999 | Casanueva | 280/208 |
| 5,947,740 A | * | 9/1999 | Kim | 434/29 |

FOREIGN PATENT DOCUMENTS

JP 9-285988 11/1997

OTHER PUBLICATIONS

Tadokoro et al. Publication entitled, "On Fundamental Design of Wire Configurations of Wire–Driven Parallel Manipulators With Redundancy", Kobe University, Department of Computer and Systems Engineering, presented at 1996 Symposium on Flexible Automation, Marriott Hotel at Copley Plaza, Boston, Massachusetts, Jul. 7–10, vol. 1, pp. 155–158.

* cited by examiner

Primary Examiner—Derris H. Banks
Assistant Examiner—Dmitry Suhol
(74) Attorney, Agent, or Firm—Sterne, Kessler, Goldstein & Fox P.L.L.C.

(57) ABSTRACT

A six-degree-of-freedom travelling system, wherein a solid is driven by eight suspending lines in six degrees of freedom. The six-degree-of-freedom travelling system can be provided as a bodily sensing machine comprising a human-riding cage: eight suspending lines in connection with the cage; eight actuators hauling and veering the respective lines for vary the position and attitude of the cage, and a controller controlling the eight actuators for constantly holding the eight lines under proper tensions, wherein the cage is travelled in six degrees of freedom.

7 Claims, 16 Drawing Sheets

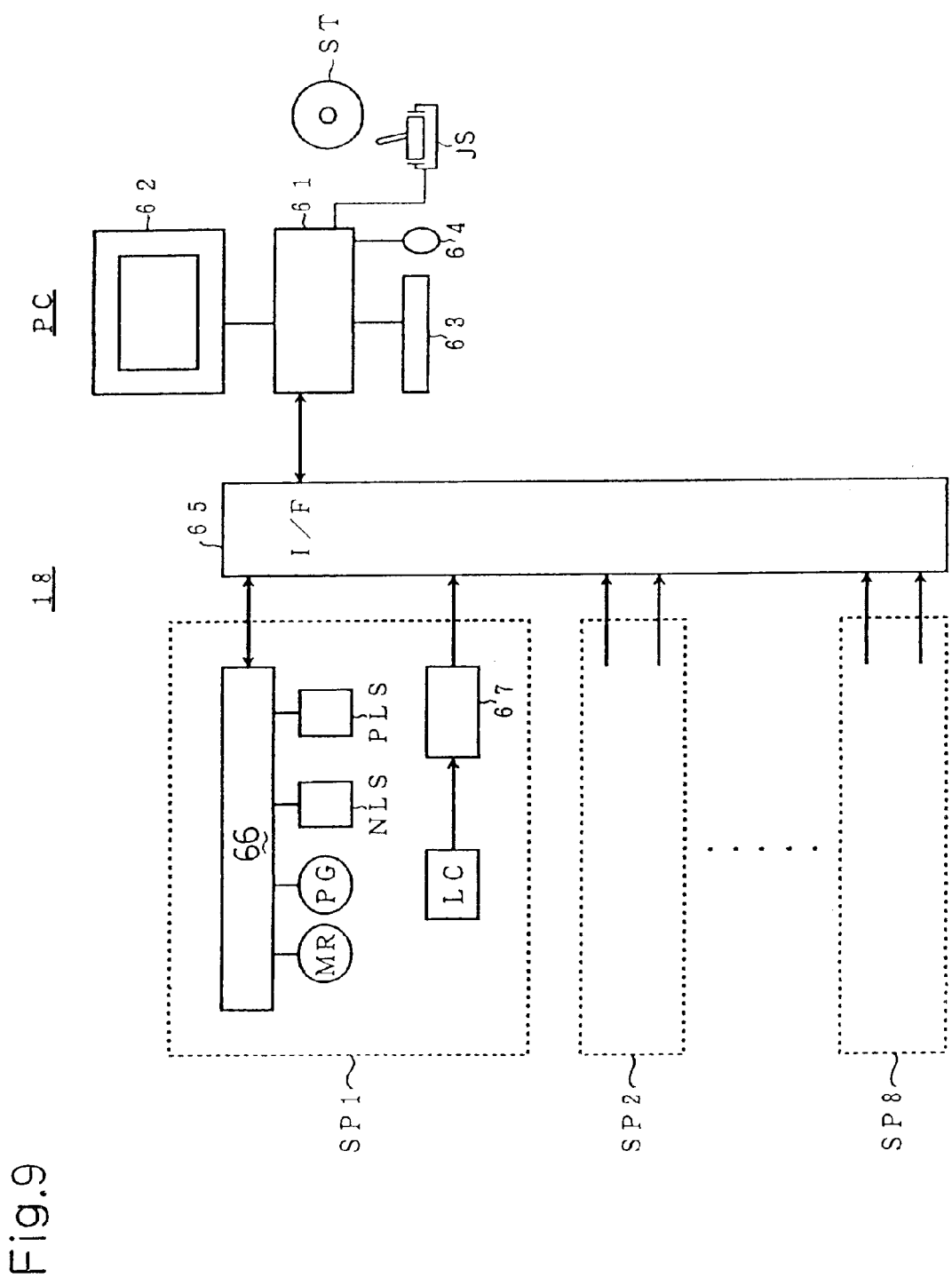

(a)

(c)

6-DEGREE-OF-FREEDOM TRAVELLING SYSTEM

BACKGROUND OF THE INVENTION

1. Field of the Invention

The present invention related to a 6-degree-of-freedom (6-DOF) travelling system, particularly provides as a bodily sensing machine like a flight simulator for training or amusement, that has a human-riding cage serving as a manipulated object in a certain space.

2. Related Art

A human-riding cage of a 6-DOF travelling system serving as a bodily sensing machine like a flight simulator for training or amusement has been manipulated by six serial links comprising six linear actuators like hydraulic cylinders, or manipulated by some parallel links driven by gears or so on. The serial link mechanism and the parallel link mechanism are disclosed in Japanese Patent Laid-Open Gazette No. Hei 9-285,988 as prior arts for manipulators, however, they have actually been used for driving the cage of the bodily sensing machine and the like.

The serial link mechanism and the parallel link mechanism have the problem that a floor of the cage supported by either of them becomes high, thereby requiring a stool for getting on and off the cage.

Furthermore, the system using the serial link mechanism is disadvantageous in that it cannot take a large space for driving the cage relative to the dimension and form thereof because the cylinders as the linear actuators are liable to interfere with one another, and in that it requires great energy or power to drive piston rods of the cylinders for executing the 6-DOF motion of the cage.

The parallel link mechanism also requires great energy to be driven because its moving parts are heavy. Furthermore, the working space is small and its travelling object sometimes becomes a singular point at the center of the working space, where the travelling object cannot generates force against external force.

It will now be proposed that a cage is suspended by a plurality of lines like wires or cables for solving the above-mentioned problem, in other words, for reduction of driving energy and for lowering the floor of the cage.

In this regard, the above document discloses a manipulator having a travelling plate, which is originally horizontal, disposed between upper and lower fixed plates and moved in six degrees of freedom by wires and spools driven by motors. However, the shown manipulation mechanism cannot be applied for construction of a bodily sensing machine even if the travelling plate is replaced with a human-riding cage.

For a 6-DOF travelling system using lines, there is a paper written by Satoshi Tadokoro, Shinsuke Nishioka, Tetsuya Kimura, Motofumi Hattori, Toshi Takamori and Kiyoshi Maeda in the title of "On Fundamental Design of Wire Configurations of Wire-Driven Parallel Manipulators with Redundancy, Proc. 1996 Japan-U.S.A. Symposium on Flexible Automation, Marriott Hotel at Copley Place, Boston, Mass., July 7–10, Vol. 1, pp. 151–158, 1996".

In this paper, there is a reference made to the effects of the redundancy caused by more than six, especially eight suspending lines. Furthermore, this paper advances the two best designs having eight suspending lines satisfying heuristics as follows: wires should suspend the travelling plate antagonistically to one another so as to apply tensions onto the plate in both opposite directions; the distance between wires and the center of gravity of the travelling plate should be long for applying moment effectively; wires are desirably longer for larger working space while being prevented from their contact with one another; there should be enough margin at one side of the travelling plate at least, where no wire crosses for prevent the wires from contact to end-effectors (later-discussed pulleys serving as fixed points) and the travelling object; and characteristics is desirably symmetric with respect to the approach axis of the end-effector.

One of the two designs (in the name of the T-type) is advantageous in wide rotation at most points, especially in the rotation round the z axis, and the other (in the name of the Rod-type) in translation. The T-type has such a configuration that two wires extend through one fixed point above the travelling plate to the front and rear ends of the travelling plate, and three wires extend in connection with the travelling plate through each of two fixed points disposed laterally symmetrically with respect to the travelling plate.

SUMMARY OF THE INVENTION

The object of the present invention is to provide a bodily sensing machine replacing that driven by serial or parallel links, wherein a human-riding cage can be sufficiently lowered for getting on and off, and is driven in six degrees of freedom by actuators whose moving portions are light, so as to reduce the driving cost and to make the cage widely rotate at most points.

To achieve the object, the bodily sensing machine according to the present invention comprises a human-riding cage; a plurality of, preferably, eight wires connected to the cage; an actuator hauling up and veering out each wire for varying the position and attitude of the cage, and a controller system controlling the tension of each wire without looseness, so as to drive the cage in six degrees of freedom.

Also, the present invention provides a 6-DOF travelling system such that a solid which is applicable to the cage is suspended and driven by eight lines in a certain space. The system serves as an application of the cited T-type plate travelling system using eight lines for construction of a bodily sensing system.

To achieve the object, the 6-DOF travelling system according to the present invention is provided with a solid serving as a travelling object which has eight connection points; eight lines hauled up and veered out in connection with the respective connection points of the solid; and three fixed points guiding the eight lines therethrough. Each of the three fixed points is equivalent to one point. The three fixed points consists of a top fixed point disposed above the solid; a right fixed point disposed rightward from the solid; and a left fixed point disposed leftward from the solid. The right and left fixed points are laterally-symmetrically disposed with respect to the solid when the solid is originally positioned.

The eight connection points of the solid consists of first-eighth connection points:

The first connection point and the second connection point are disposed forward and backward on the top of the solid. Two of the eight lines in connection with the respective first and second connection points are extended through the top fixed point.

The forward upper third connection point, the backward upper fourth connection point and the longitudinally-middle lower fifth connection point are disposed at rightward portions of the solid, so that the three rightward connection points are arranged so as to form a vertically-flapped isosceles triangle with the fifth connection point as the bottom vertex thereof. Three of the eight lines in connection with the respective third, fourth and fifth connection points are extended through the right fixed point.

The forward upper sixth connection point, the backward upper seventh connection point and the longitudinally-middle lower eighth connection point are disposed at leftward portions of the solid, so that the three leftward connection points are arranged so as to form a vertically-flapped isosceles triangle with the eighth connection point as the bottom vertex thereof, which is identical with the triangle shape made by the three rightward connection points. Three of the eight lines in connection with the respective sixth, seventh and eighth connection points are extended through the left fixed point.

The third and sixth connection points are arranged symmetrically with respect to the first connection point. The fourth and seventh connection points are arranged symmetrically with respect to the second connection point.

According to the present 6-DOF travelling system, any of the eight lines is varied in its length between corresponding one of the eight connection points and corresponding one of the three fixed points while being adjusted in its tension, thereby moving the solid in six degrees of freedom.

The solid of the above-mentioned 6-DOF travelling system has a longitudinally cylindrical body which is laterally-symmetrically polygonal, preferably, octagonal when viewed along the longitudinal direction of the solid. The octagonal cylindrical cage as an application of the solid matches with the contradictory requests: minimization of the entire thereof and widening of the inner space thereof.

The polygonal (octagonal) shape as the view of the solid taken along the longitudinal direction of the solid has a pair of originally-lateral top and bottom sides, so that the floor of the cage as an application of the solid is originally horizontal, thereby being comfortable for a rider.

The solid has a pair of originally-vertical front and rear surfaces in the polygonal shapes. The originally-lateral top side of the front surface is provided on its middle portion with the first connection point, on its right end with the third connection point and on its left end with the sixth connection point. The originally-lateral top side of the rear surface is provided on its middle portion with the second connection point, on its right end with the fourth connection point and on its left end with the seventh connection point.

Additionally, an edge joining the right ends of the originally-lateral bottom sides of the front and rear surfaces is provided on its middle portion with the fifth connection point, and an edge joining the left ends of the same bottom sides is provided on its middle portion with the eighth connection point.

Such a shape of the solid and such an arrangement of the lines suspending the solid enables the so lid to be widely rotated at most points. Hence, the 6-DOF travelling system is sufficiently appropriate to the above-mentioned bodily sensing machine.

Other and further objects, features and advantages of the present invention will appear more fully from the following description.

BRIEF DESCRIPTION OF THE DRAWINGS

FIG. 9 is a block schematic diagram of a controller system;

DETAILED DESCRIPTION OF THE PREFERRED EMBODIMENTS

Figure 1:
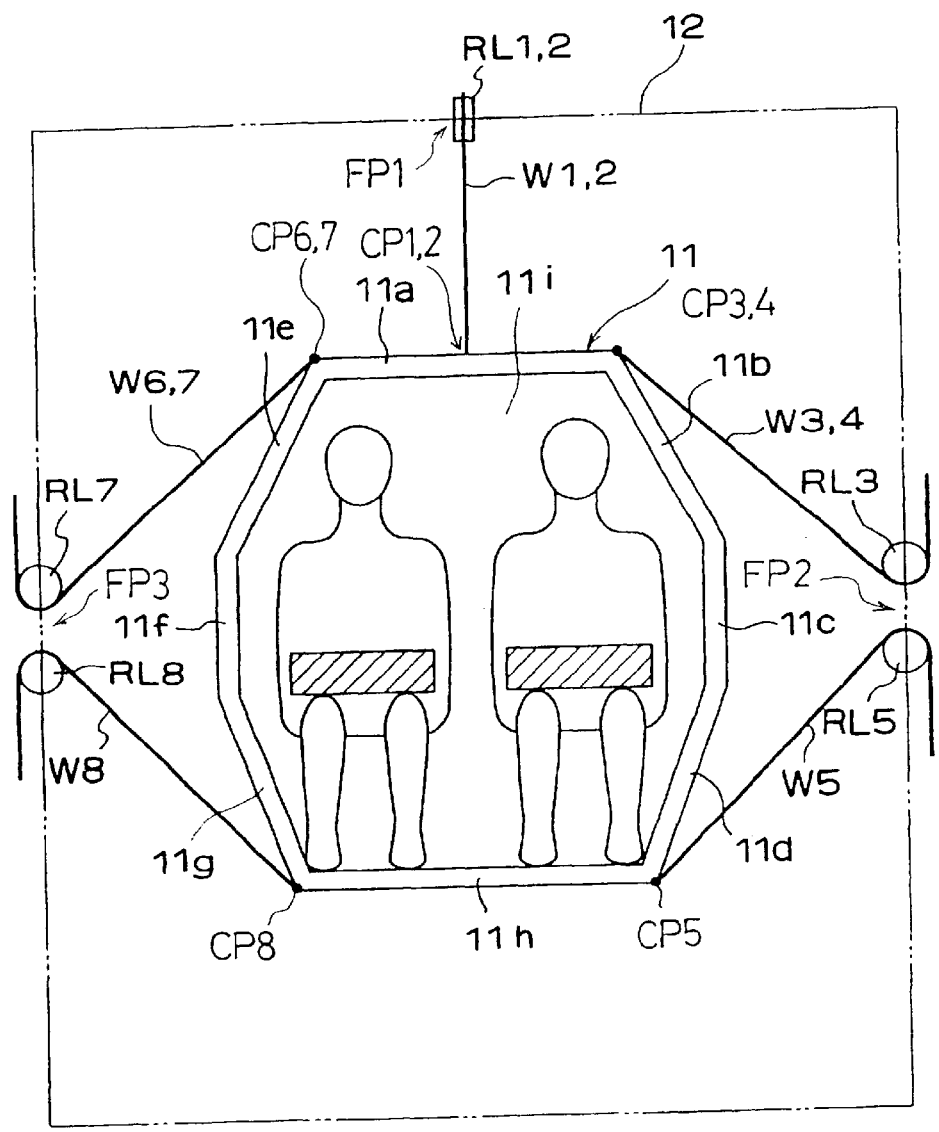
FIG. 1 is a front view of a bodily sensing machine as an embodiment of a 6-DOF travelling system according to the present invention.
Figure 2:
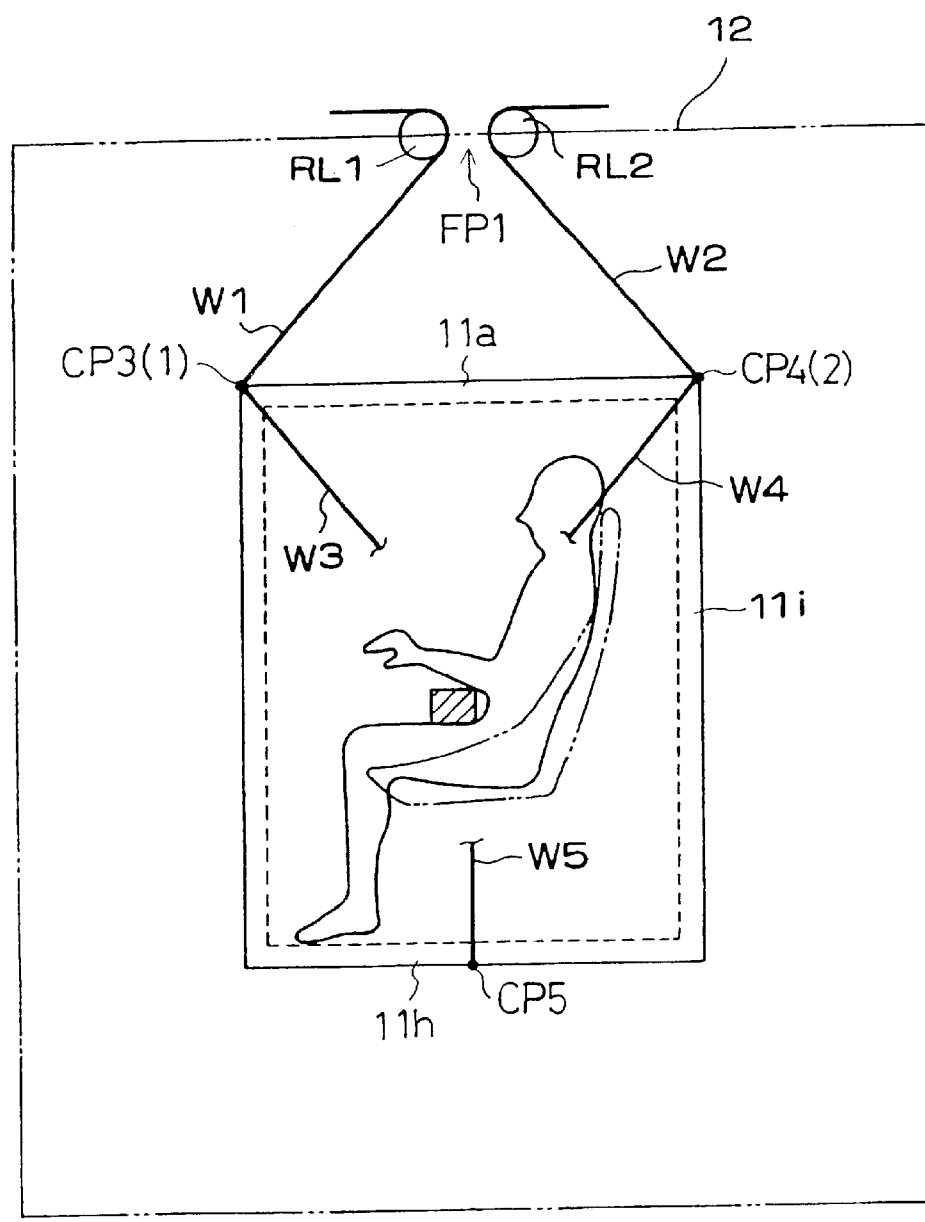
FIG. 2 is a right side view of the same.
Figure 3:
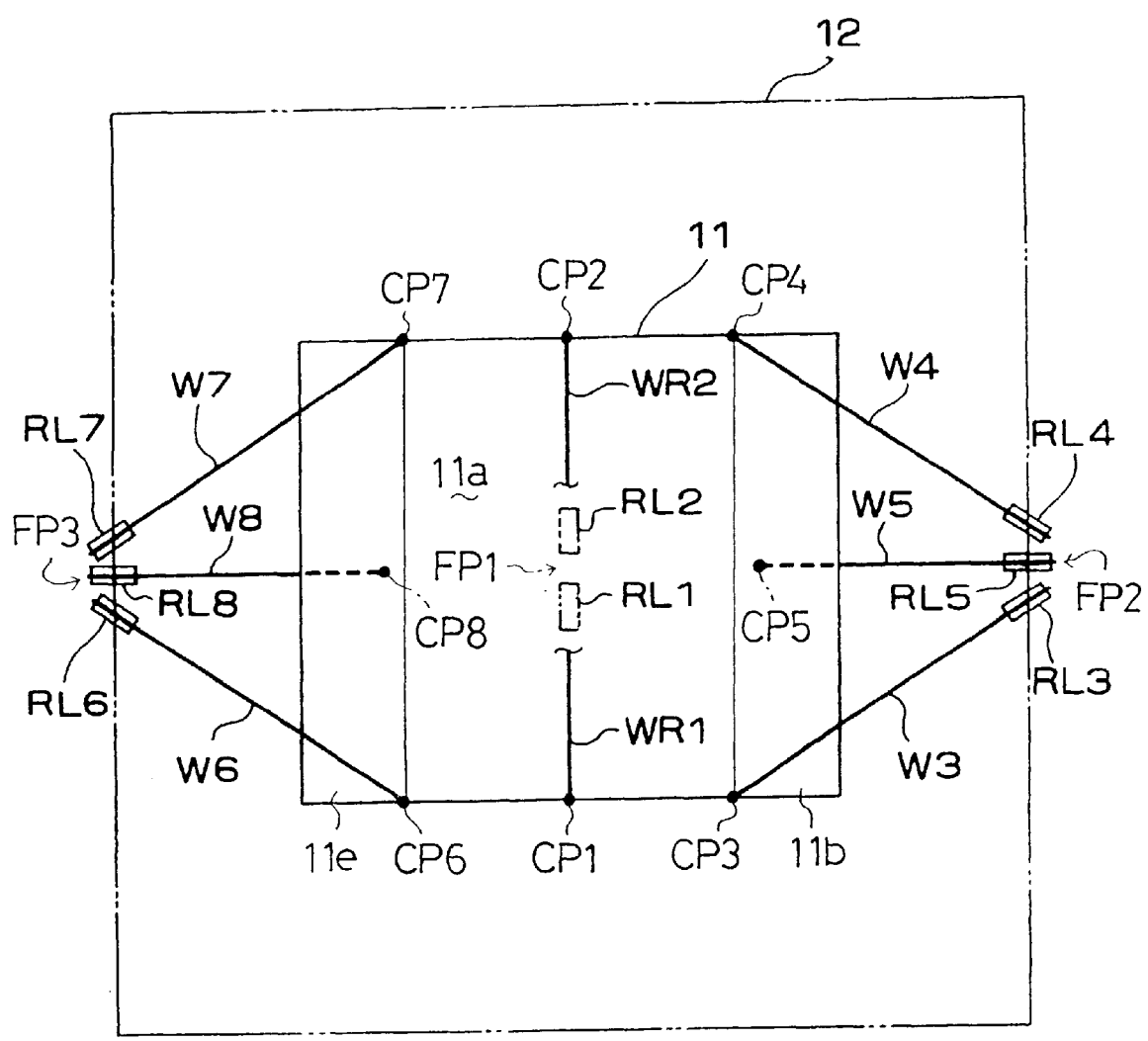
FIG. 3 is a plan view of the same.

Description will be given on a bodily sensing machine 1 as an embodiment of a 6-DOF travelling system according to the present invention. As shown in FIGS. 1–3, bodily sensing machine 1 comprises a human-riding cage 11, a bodily sensing room 12 as a certain space where cage 11 can sufficiently move in six degrees of freedom, eight wires W(W1–W8) as lines suspending cage 11, eight rotatable and revolable pulleys RL(RL1–RL8) guiding respective wires W therethrough, eight actuators 13 (shown in FIG. 4) veering out and hauling up respective wires W for changing the position and attitude cage 11, and a controller system 18 (shown in FIG. 8) controlling eight actuators 13 for moving cage 11 in the condition that each wire W is constantly pulled in a tension beyond zero.

Apparently, cage 11 has a longitudinally cylindrical (drum-shaped) body which is a laterally symmetric polygon when viewed in front, and a tetragon when viewed in side and plan. In this embodiment, especially, the polygon as a front view of cage 11, when being originally positioned, is an octagon having lateral top and bottom sides. Accordingly, cage 11 is minimized but has a sufficient lateral width for the rider's comfort. Alternatively, the front shape of cage 11 may be tetragonal or hexagonal.

Cage 11 consists of an originally-horizontal top surface 11a, right side surfaces 11b, 11c and 11d (vertically-middle surface 11c is vertical), left side surfaces 11e, 11f and 11g (vertically-middle surface 11f is vertical), an originally-horizontal bottom surface 11h and an originally-vertical rear surface 11i. Cage 11 is forwardly open.

Alternatively, cage 11 may be closed both forward and backward and be provided at one or more spontaneous positions of front, rear, left and right sides thereof with a door or doors for getting on and off. If the front surface is closed, a window is preferably provided in the front surface so that a rider in cage 11 can look at a later-discussed screen in bodily sensing room 12. Such windows may be provided in both or either of the left and right sides of cage 11. If a window is provided in rear surface 11i, a back mirror is preferably provided in cage 11.

Since cage 11 is laterally-symmetrically geometrized as the above, cage 11 is laterally-symmetrically balanced in weight.

A human-riding cage for bodily sensing machine 1 as a 6-DOF travelling system is desired to be minimized in all directions for maximizing its movable space in a limited space as bodily sensing room 12. However, the cage must provide a rider therein with a comfortably wide space. Octagonally-cylindrical cage 11 matches with the two contradictory requests.

In detail, cage 11 compensates the wide space between left and right side surfaces 11c and 11e where a rider is allowed to rest and move his or her arms for minimization of its ceiling (top surface 11a) and floor (bottom surface 11h) in width.

Supposing a tetragonally-cylindrical cage, the width of the cage is invariant along its vertical direction. If its width is determined so as to minimize its floor in width, a rider feels narrowed at his or her bust. If the width is determined so that the left and right side surfaces are sufficiently spaced from each other so as to make the rider loose, the top and floor surfaces become excessively wide so that the both left and right side edges of the both surfaces project sideward. Such projecting edges are liable to contact wires, or restrict the movable space of the cage.

For the purpose of widening the vertically-middle space in a cage while minimizing the width of its top and bottom, a hexagonally-cylindrical cage may be conceivable. However, such formed cage projects sideward at the vertically-middle left and right edges thereof. By this reason, the effective lateral range for motion of the cage becomes narrowed relative to the whole lateral width of a working space as bodily sensing room 12.

From this viewpoint, octagonally-cylindrical cage 11 is advantageous because its vertically-middle left and right portions are cut away by originally-vertical right and left side surfaces 11c and 11e. When either right wires W3–W5 or left wires W6–W8 are hauled up so as to pull cage 11, cage 11 can extremely approach the corresponding one of right and left side ends of bodily sensing room 12, thereby laterally widening the effective range for the motion of cage 11 relative to the whole of lateral width in bodily sensing room 12. Conversely, while assuring the lateral effective range for the motion of cage 11, bodily sensing room 12 can be reduced in width. Accordingly, bodily sensing machine 1 can be installed in a normal floor space of a typical building, for example.

In the embodiment shown in FIG. 1, cage 11 is appropriate for two riders, so that a pair of seats with seat belts are provided in cage 11. The seat for bodily sensing machine 1 is preferably directed forward and fixed to bottom surface 11h, but may be directed sidewise or backward. If bodily sensing machine 1, whether being modified or unmodified in the arrangement or control system of wires or so on, is applied as a mobile means for medical service or care, a swivel chair is preferred to a fixed seat, and doors and windows should be preferably provided at spontaneous portions of cage 11 in combination with the later-discussed modification of bodily sensing room 12 for the same purpose.

Bodily sensing room 12 is, for example, formed by a rigid frame, a container, or walls of a building. In bodily sensing room 12 is disposed a screen. On the screen is cast such a reflection as to enhance the bodily sensation of the rider. Speakers for dramatic sound are disposed at suitable positions in bodily sensing room 12. If bodily sensing machine 1 is modified for medical service or care, bodily sensing room 12 serves as a life space, where necessaries of life like a bed and a kitchen may be disposed optionally, and a door or a window opening to another space like a bathroom and a garden may be disposed.

As the above, eight pulleys RL are disposed on end surfaces of bodily sensing room 12. Two pulleys RL1 and RL2 are disposed on the ceiling surface of bodily sensing room 12, thereby substantially forming one point in the name of a top fixed point FP1. Three pulleys RL3, RL4 and RL5 are disposed on the right side surface of bodily sensing room 12, thereby substantially forming one point in the name of a right fixed point FP2. Three pulleys RL6, RL7 and RL8 are disposed on the left side surface of bodily sensing room 12, thereby substantially forming one point in the name of a left fixed point FP3.

Wire W1 is extended through pulley RL1 to a first connection point CP1 as the middle point of an originally-lateral front edge of top surface 11a of cage 11. Wire W2 is extended through pulley RL2 to a second connection point CP2 as the middle point of an originally-lateral rear edge of top surface 11a. Both wires W1 and W2 are substantially centripetally pulled toward top fixed point FP1.

Wire W3 is extended through pulley RL3 to a third connection point CP3 as the front end of an originally-longitudinal top edge of right side surface 11b (in other words, the right end of the front edge of top surface 11a). Wire W4 is extended through pulley RL4 to a fourth connection point CP4 as the rear end of the same edge (in other words, the right end of the rear edge of top surface 11a). Wire 5 is extended through pulley RL5 to a fifth connection point CP5 as the middle point of an originally-longitudinal bottom edge of right side surface 11d. Three wires W3, W4 and W5 are substantially centripetally pulled toward right fixed point FP2.

Wire W6 is extended through pulley RL6 to a sixth connection point CP6 as the front end of an originally-longitudinal top edge of left side surface 11e (in other words, the left end of the front edge of top surface 11a). Wire W7 is extended through pulley RL7 to a seventh connection point CP7 as the rear end of the same edge (in other words, the left end of the rear edge of top surface 11a). Wire 8 is extended through pulley RL8 to an eighth connection point CP8 as the middle point of an originally-longitudinal bottom edge of left side surface 11g. Three wires W6, W7 and W8 are substantially centripetally pulled toward left fixed point FP3.

Third connection point CP3, fourth connection point CP4, and fifth connection point CP5 are arranged so as to form a vertically-flapped isosceles triangle with fifth connection point CP5 as the bottom vertex thereof. Also, sixth-connection point CP6, seventh connection point CP7 and eighth connection point CP8 are arranged so as to form a vertically-flapped isosceles triangle with eighth connection point CP8 as the bottom vertex thereof which is identical with the triangle shape made by three rightward connection points CP3–CP5.

Third and sixth connection points CP3 and CP6 are arranged symmetrically with respect to first connection point CP1. Fourth and seventh connection points CP4 and CP7 are arranged symmetrically with respect to second connection point CP2.

A universal joint like a ball-and-socket joint is disposed on each of connection points CP(CP1–CP8) of cage 11 for connection with each wire W. Accordingly, each wire W in connection with each of the joints is safe from bending force, so that each wire W can pull each connection point CP of cage 11 by full of its effective tension straightly toward corresponding fixed point FP.

Each of connection points CP1–CP8 disposed on corners or angles of cage 11 is spaced to the utmost limit from the centroid of cage 11, thereby applying moment onto cage 11 efficiently.

Wires W are hauled up and veered out by eight actuators 13 disposed outside bodily sensing room 12, respectively. Eight actuators 13 may be distributively collected so as to form three groups corresponding to te three groups of wires W pulled through respective fixed points FP1–FP3.

Figure 4:
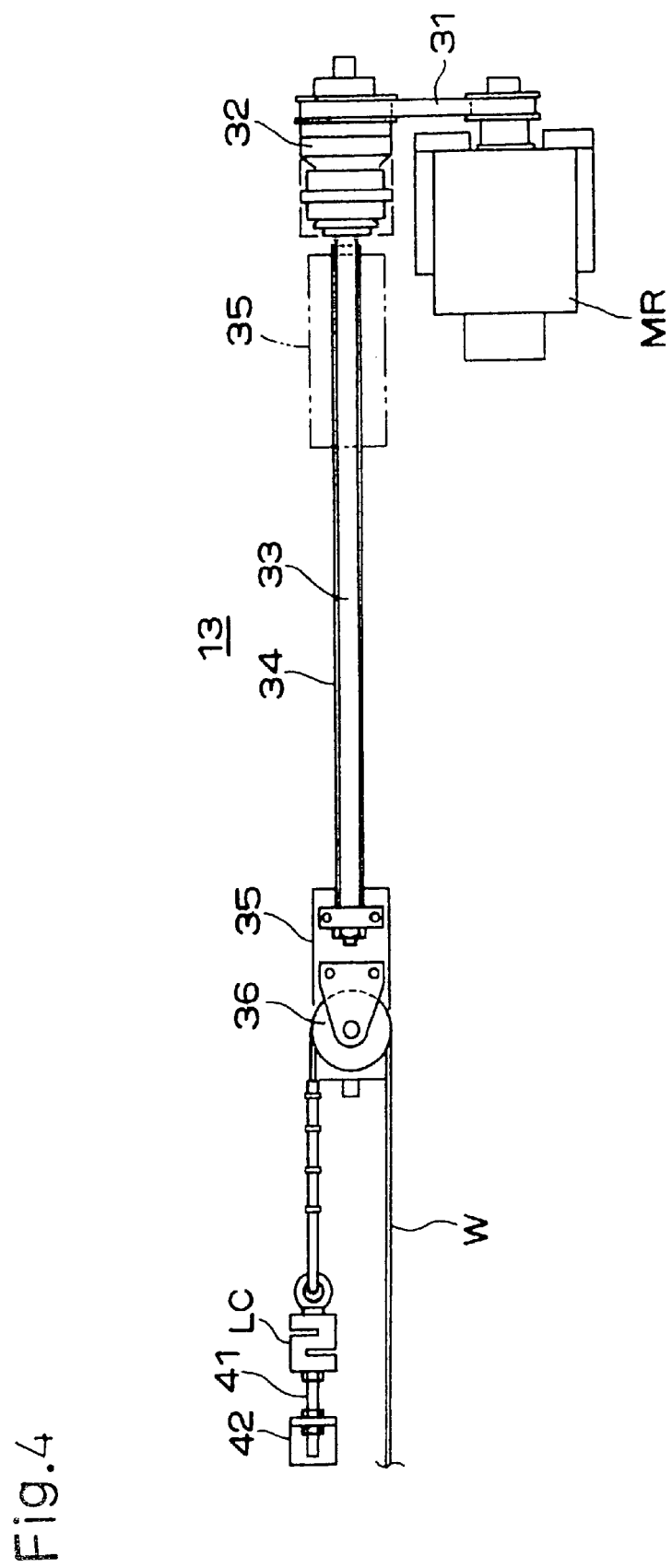
FIG. 4 is a plan view of an actuator driving a wire.

As shown in FIG. 4, actuator 13 comprises an electric servo motor MR, a belt 31, a nut 32, a threaded rod 33, a rail 34, a mobile base 35, a running block 36, and so on.

Servo motor MR can be reversed in its rotational direction. Servo motor MR is provided with a sensor (a below-discussed pulse generator PG as shown in FIG. 9) which detects the rotary direction, speed and position of servo motor MR. Nut 32 is rotated by servo motor MR through belt 31.

Alternatively, the prime mover of actuator 13 may be an oil cylinder, which is hydraulically or electro-hydraulically controlled in combination with an electric servo motor and a pump.

Anyway, wire W serving as a moving part of bodily sensing machine 1 is relatively light, so that the prime mover of actuator 13 is not required to generate such high power as that has been required for actuators of the conventional serial or parallel link mechanism, thereby saving consumed energy.

Figure 5:
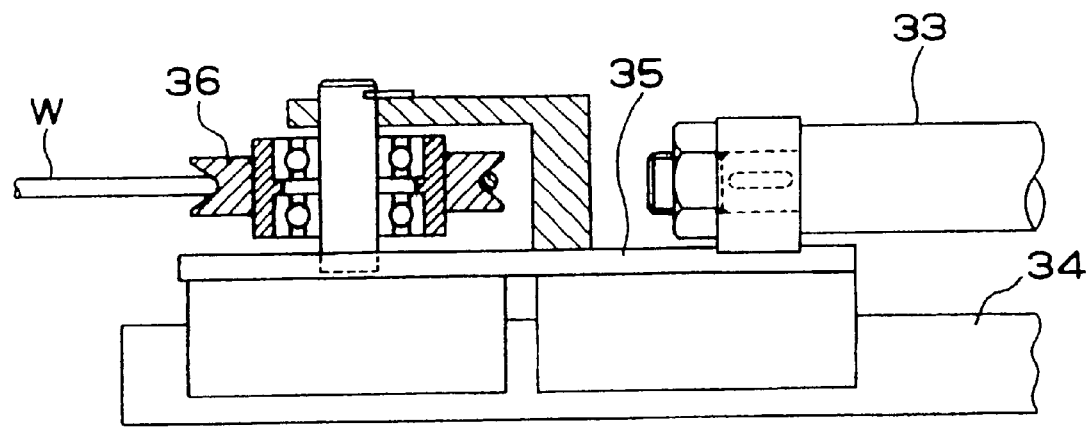
FIG. 5 is a sectional front view of a mobile base of the actuator and its surroundings.
Figure 6:
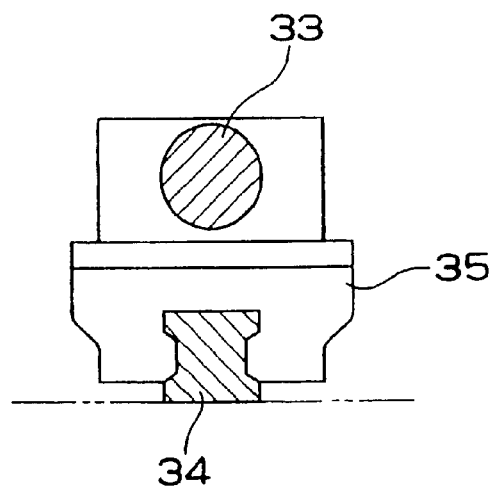
FIG. 6 is a side view of the mobile base.

Threaded rod 33 engages with nut 32 therearound and is fixed onto mobile base 35 slidably mounted on rail 34, as shown in FIGS. 5 and 6. Nut 32 is rotated by servo motor MR so as to move thread rod 33 longitudinally and mobile base 35 together along rail 34.

Figure 7:
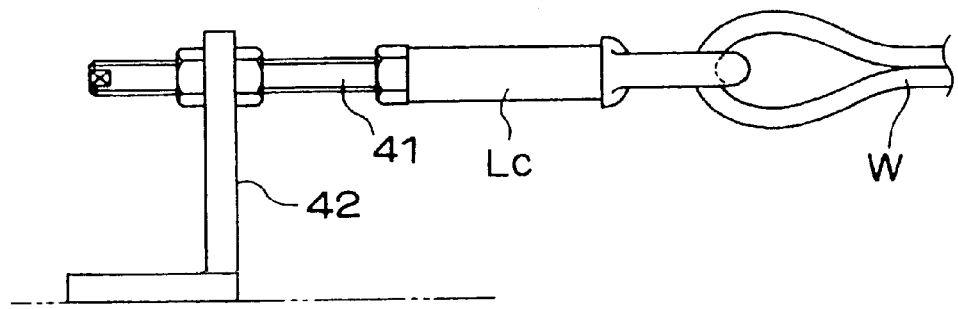
FIG. 7 is a side view of a load cell of the actuator in connection with an end of the wire.

Block 36 is rotatably provided on mobile base 35, as shown in FIGS. 4 and 5, thereby being movable integrally with mobile base 35 along rail 34. Wire W turns in the vicinity of its end around block 36. The end of wire W is formed into a ring. as shown in FIG. 7. The ring of wire W is connected to an end of load cell LC through an eyebolt. The other end of load cell LC is connected with a bracket 42 through a bolt 41. Load cell LC is distorted along the extending direction of wire W. thereby issuing a detection signal corresponding to the tension of wire W (to servo controller 66 as discussed below).

Alternatively, wire W may be pulled by more than one running blocks, or may be directly pulled by mobile base 35 without block 36. Wire W may be reeled around a rotatable drum.

Figure 8:
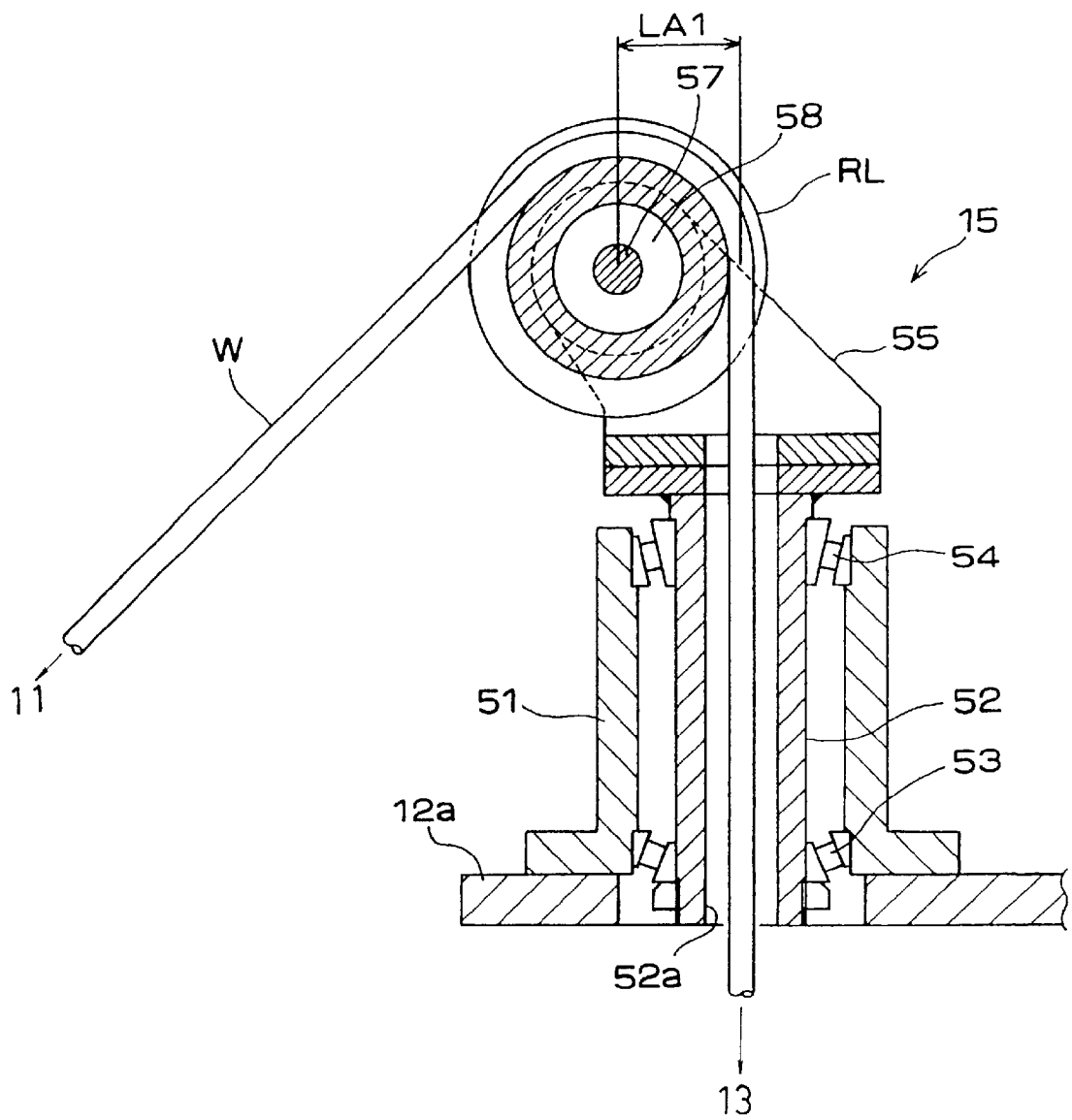
FIG. 8 is a sectional front view of a pulley and a pulley supporter.

Pulleys RL are supported by respective pulley supporters 15. As shown in FIG. 8, pulley supporter 15 comprises a base plate 12a, a cylindrical fixed bracket 51, a swivel pipe 52, bearings 53 and 54, a swivel bracket 55, a pulley shaft 57 and a bearing 58.

Base plate 12a is fixed onto a wall or a frame serving as an end surface of bodily sensing room 12, however, it may be a part of the wall or frame, alternatively. Fixed bracket 51 is fixed onto base plate 12a through bolts. Swivel pipe 52 is rotatably supported in fixed bracket 51 through the pair of bearings 53 and 54. Bearings 53 and 54 are accommodated to both thrust and radial stresses. Wire W is disposed along the axis of an axial hole 52a of swivel pipe 52.

Swivel bracket 55 is fixed at its basic end onto swivel pipe 52 by bolts or others. Pulley shaft 57 is disposed across swivel bracket 55, and pulley RL is rotatably disposed around pulley shaft 57 through bearing 58.

Swivel bracket 55 is bent at a caster angle so as to locate the center of pulley RL or pulley shaft 57 perpendicularly away from the axis of hole 52a at a length LA1. Swivel pipe 52 and swivel bracket 55 are integrally rotated so that pulley shaft 57 revolves round axial hole 52a at a radial of length LA1 when viewed along the axial direction of hole 52a, whereby pulley RL revolves round hole 52a.

Length LA1 coincides with the distance between the axis of pulley shaft 57 and the axis of wire W hung on pulley RL. Accordingly, wire W extended from cage 11 turns around pulley RL and further extends through hole 52a of swivel pipe 52 in the state that the axes of both wire WV and hole 52a coincide with each other, so as to be led to load cell LC of actuator 13 smoothly and certainly. During the rotation of swivel pipe 52 and swivel bracket 55 (the revolution of pulley RL), wire W is hardly off course in pipe 52 but kinks slightly. However, wire W accommodates its flection to the kink due to the fitting of axial length and diameter of hole 52a of pipe 52. Accordingly, wire W does not flex or kink at the portions thereof between pulley RL and connection point CP and between the opening of hole 52a in opposite to pulley RL and load cell LC of actuator 13.

Due to the above construction, any of actuators 13 acts in the following processes:

Servo motor MR is driven so as to rotate nut 32 at any rotary speed, angle and direction. Threaded rod 33 moves correspondingly to the values regarding the rotation of nut 32, and simultaneously, mobile base 35 and block 36 moves together. The extension of wire W between fixed point FP and connection point CP is varied at double the distance covered by running block 36. During the variation, pulley RL rotates round pulley shaft 57 and revolves round axial hole 52a, so as to lead wire W hauled up or veered out without flexion or kink.

The other wires W are veered out or hauled up while their tensions are adjusted by servo motors MR of actuators 13, respectively, so that each extension between fixed point FP and connection point CP is varied. As a result, cage 11 is moved or tilted. The tensions of wires W are controlled by controller system 18 using respective load cells LC.

As shown in FIG. 9, controller system 18 comprises a processor 61, a display 62, a keyboard 63, a mouse 64, a joystick JS, an interface 65 and eight servo packages SP1–SP8.

Processor 61 includes a CPU, a RAM, a ROM and other peripheral elements. The CPU executes programs and sends command signals to interface 65, thereby controlling each actuator 13 so as to control the position and tension of each wire W. Processor 61 is optionally provided therein with a magnetic disc drive, a magnet-optic disc drive, a floppy disc drive, a CD-ROM drive, or the like. A recording medium ST stored in or supplied into such a drive retains programs and data. which are loaded onto the RAM when executing. Processor 61 and recording medium or media ST store programs for controlling eight servo packages SP1–SP8, data of visual imaginaries to be reflected on the screen and of sound to be generated from the speakers, and the like. Additionally, processor 61 may communicate with another CPU or network through a modem or the like.

Display 62 indicates various data and visual imaginaries regarding the real execution of processor 61, the acting condition of actuator 13, the attitude and position of cage 11, the condition of bodily sensing room 12, and so on.

Keyboard 63 and mouse 64 are used for inputting data, programs and commands into processor 61. For the data to be input is considered, for example, the tension and position of each wire W predetermined correspondingly to any timing during the whole process of a simulation program.

Joystick JS is disposed in cage 11 so as to be manually operated by a rider. Alternatively, joystick JS may be disposed in a remote-controlling room outside bodily sensing room 12. Joystick JS is operated so as to control the position and attitude of cage 11. Processor 61 analyzes the signal about the position and motion of joystick JS is input into processor 61. Processor 61 analyzes the imaginary position and tension of each wire W from the signal from joystick JS and issues a command to interfere 65.

Processor 61, display 62, keyboard 63, mouse 64 and joystick JS may be provided as a personal computer or a work station in communication with fitting peripheral implements, for example.

Interface 65 includes a DSP, a CPU, a RAM, logic circuits and other peripheral elements. Interface 56 receives and feedbacks signals from and to processor 61 so as to control servo packages SP1–SP8.

Each of servo packages SP1–SP8 includes a servo controller 66, an amplifier 67, servo motor MR, pulse generator PG, load cell LC, limit switches NLS and PLS, and the like.

Servo controller 66 controls servo motor MR in direction, speed and angle according to command signals from interface 65 and feedback signals from pulse generator PG, load cell LC through amplifier 67, limit switches NLS and PLS, and another sensor, switch, button or the like.

Due to such construction of controller system 18, according to the program at any time stored in processor 61 or recording media ST, or according to the optional operation of joystick JS, processor 61 determines the targets positions and tensions of eight wires W so that servo motors MR of servo packages SP1–SP8 are drivingly controlled under the supervision of tensions detected by load cells LC, thereby hauling up and veering out eight wires W. As a result, cage 11 is controlled in its attitude and position and in its velocity and acceleration at the will of the operator of joystick JS or according to the predetermined simulation program.

Description will now be given on the characteristic attitude and position of cage 11 driven by wires W according to FIGS. 10–12.

Figure 10A:
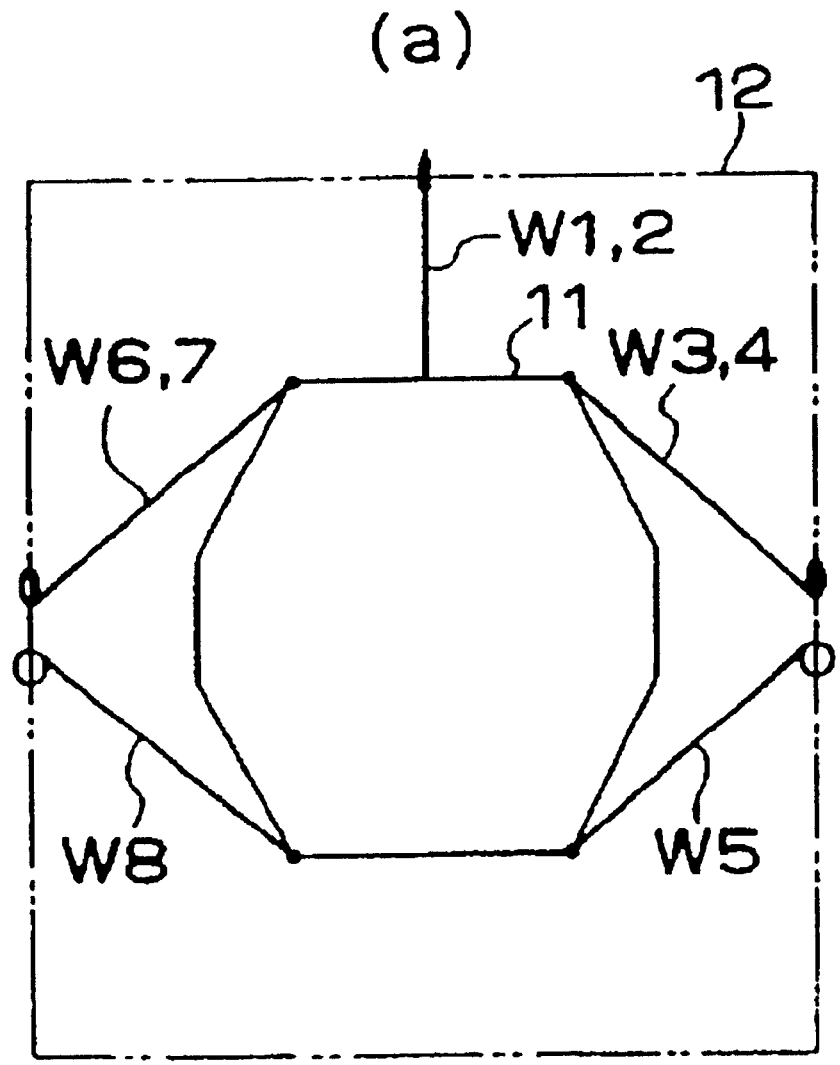
FIGS. 10(a)–(c) are schematic views of the bodily sensing machine when a cage is originally positioned, (a) is a front view, (b) is a side view, and (c) is a plan view.
Figure 10B:
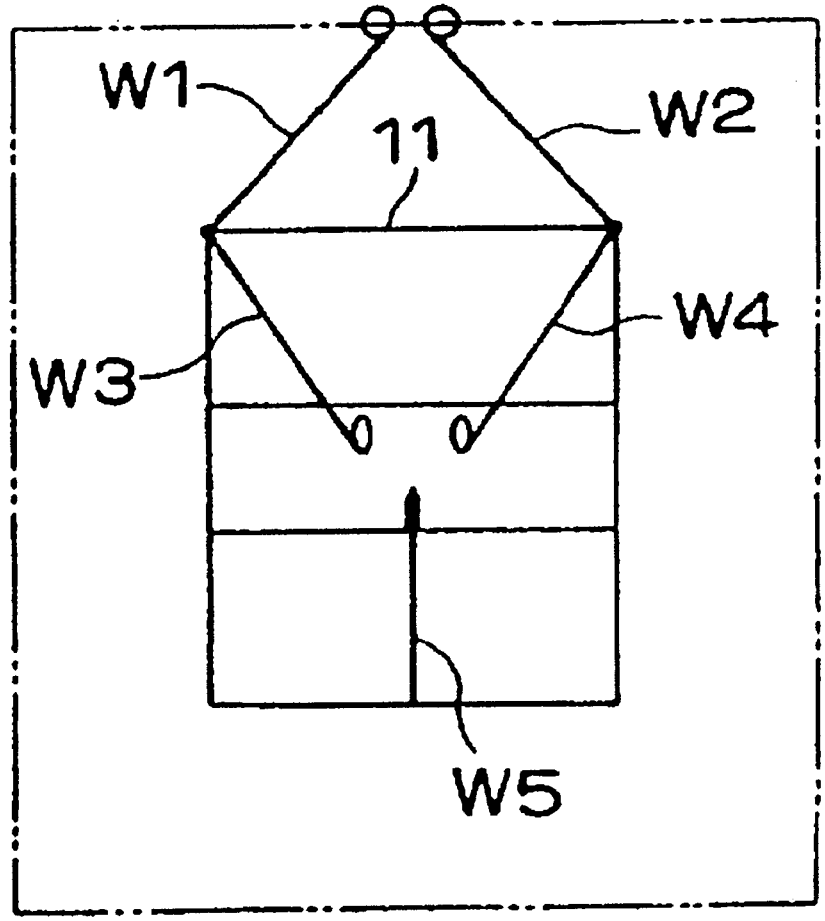
Figure 10C:
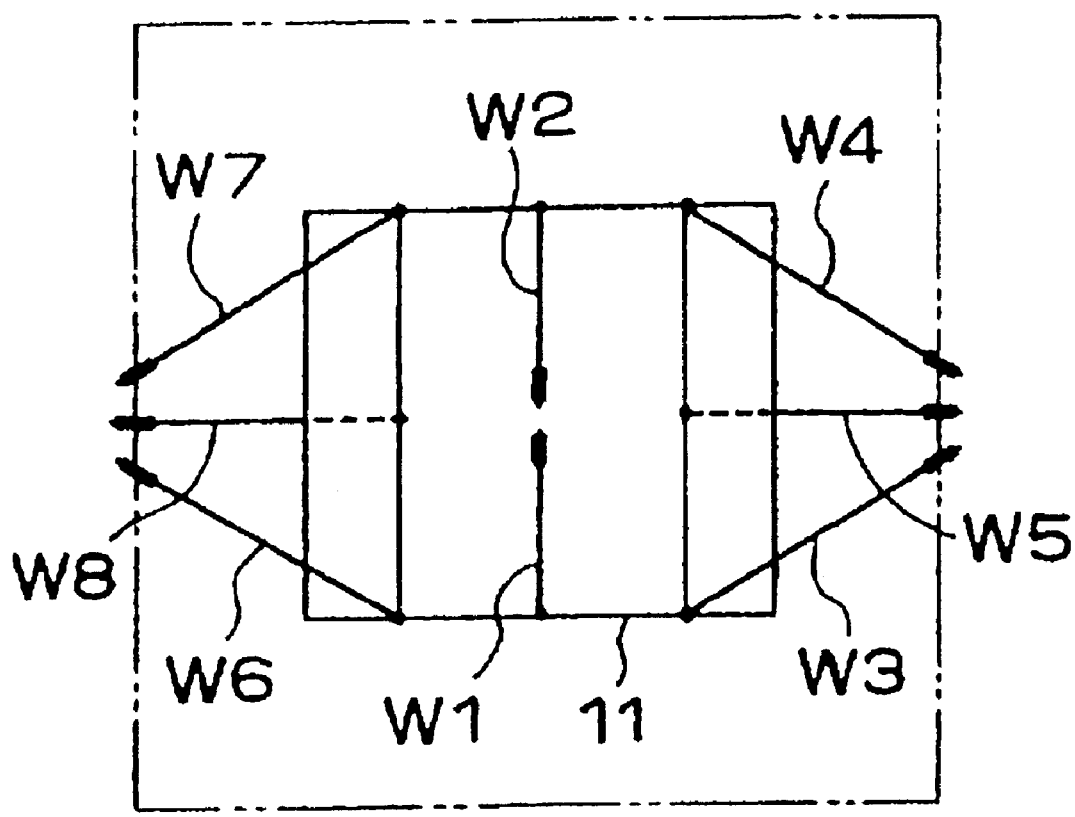

Referring to FIG. 10, cage 11 is originally stationary in a substantially center position of bodily sensing room 12 as shown in FIGS. 1–3, wherein top and bottom surfaces 11a and 11h are substantially horizontal, and right and left side surfaces 11c and 11f, rear surface 11i and the front surface are substantially vertical. Right and left fixed points FP1 and FP2 are disposed laterally symmetrically with respect to cage 11 so that wires W1 and W2 are substantially vertical when viewed in front. Accordingly, tensions are substantially equalized between right wires W3–W5 and left wires W6–W8, and between upper wires W1 and W2.

If the x axis is fixed laterally in FIG. 10(a), the y axis laterally in FIG. 10(b), and the z axis vertically in FIG. 10(a), bodily sensing machine 1 is constructionally symmetric with respect to the xz surface and the yz surface. Thus, the gravity and tensions applied on cage 11 are laterally symmetric, thereby making cage 11 symmetrically movable. Since a human being is sensitive to lateral asymmetry, the symmetric function is important for the rider in the cage to be prevented from malaise.

Figure 11A:
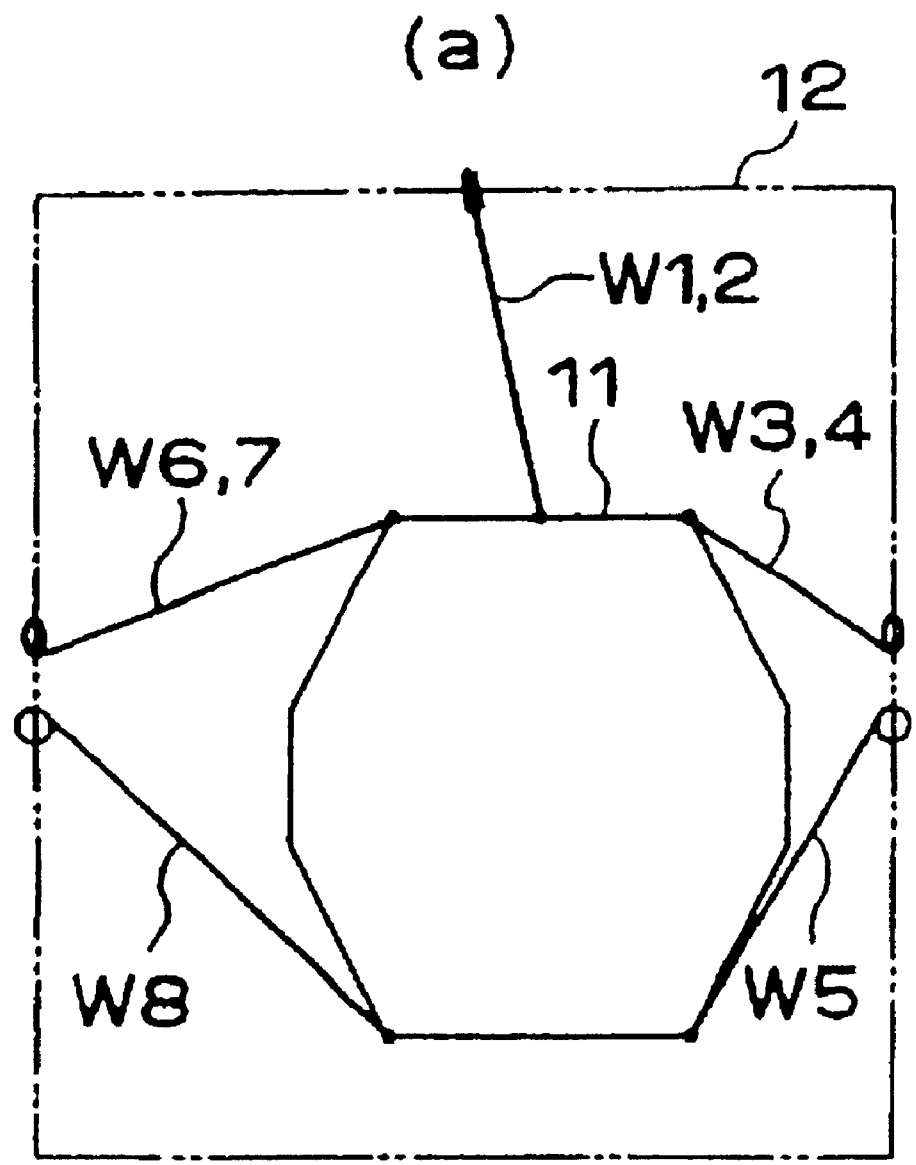
FIGS. 11(a)–(c) are schematic views of the bodily sensing machine when the cage which has been shifted from its original position takes the original attitude, (a) is a front view, (b) is a side view, and (c) is a plan view.
Figure 11B:
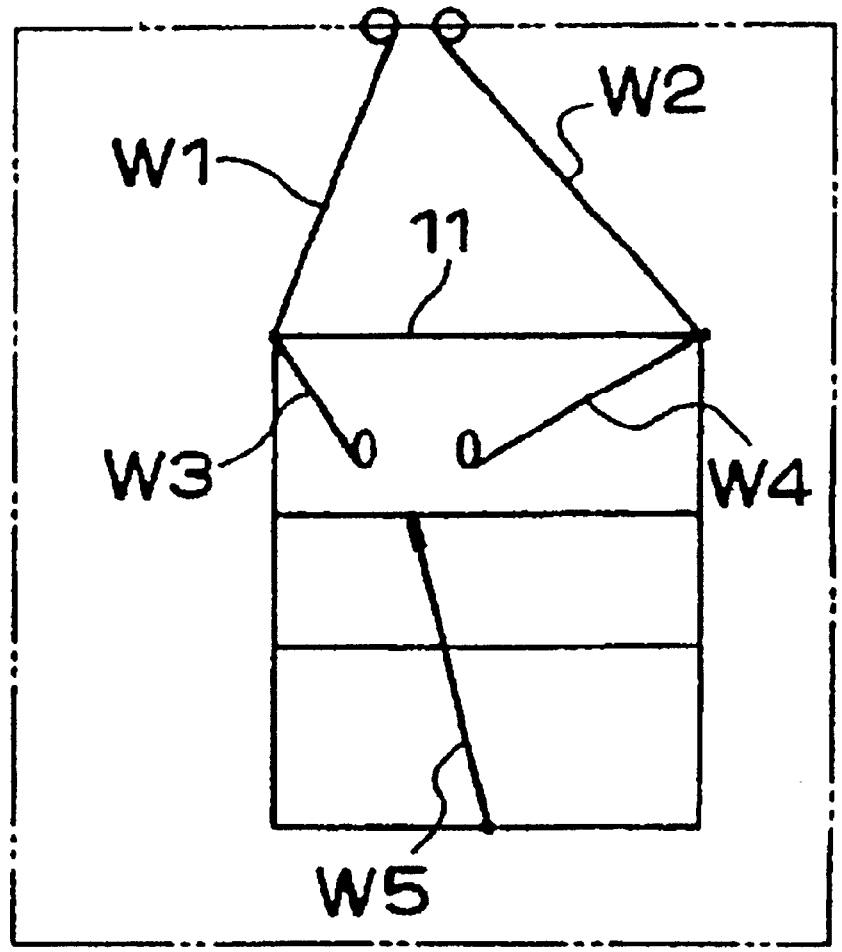
Figure 11C:
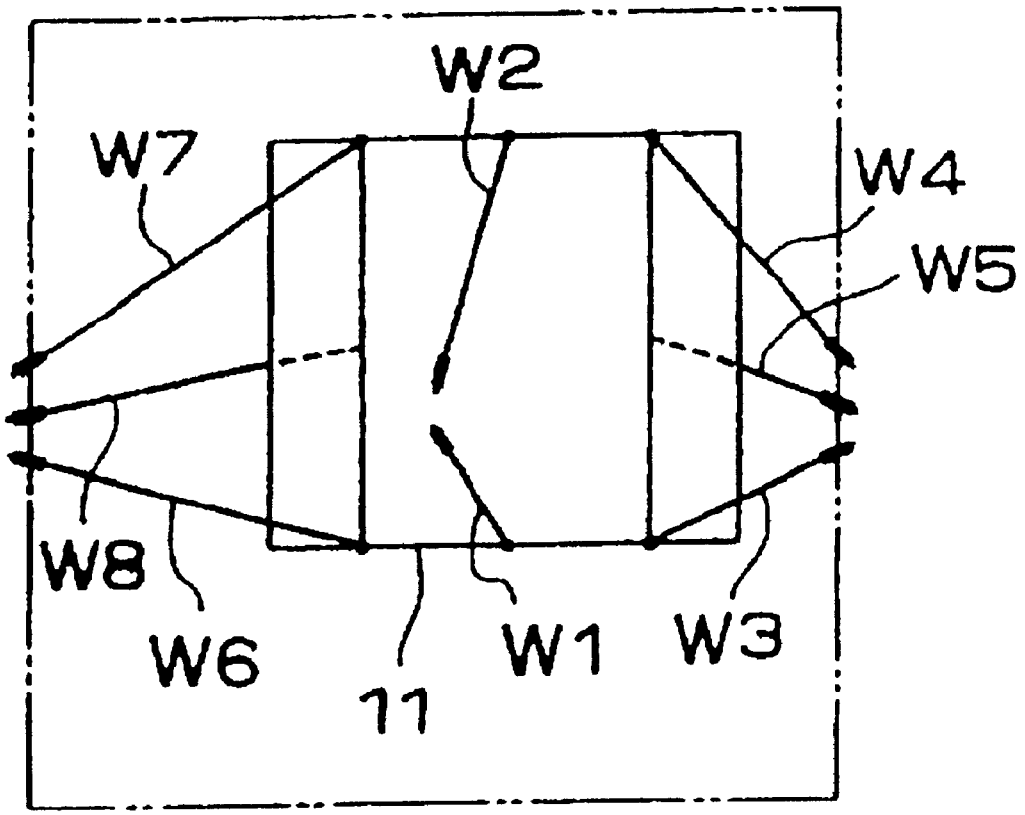
Figure 12A:
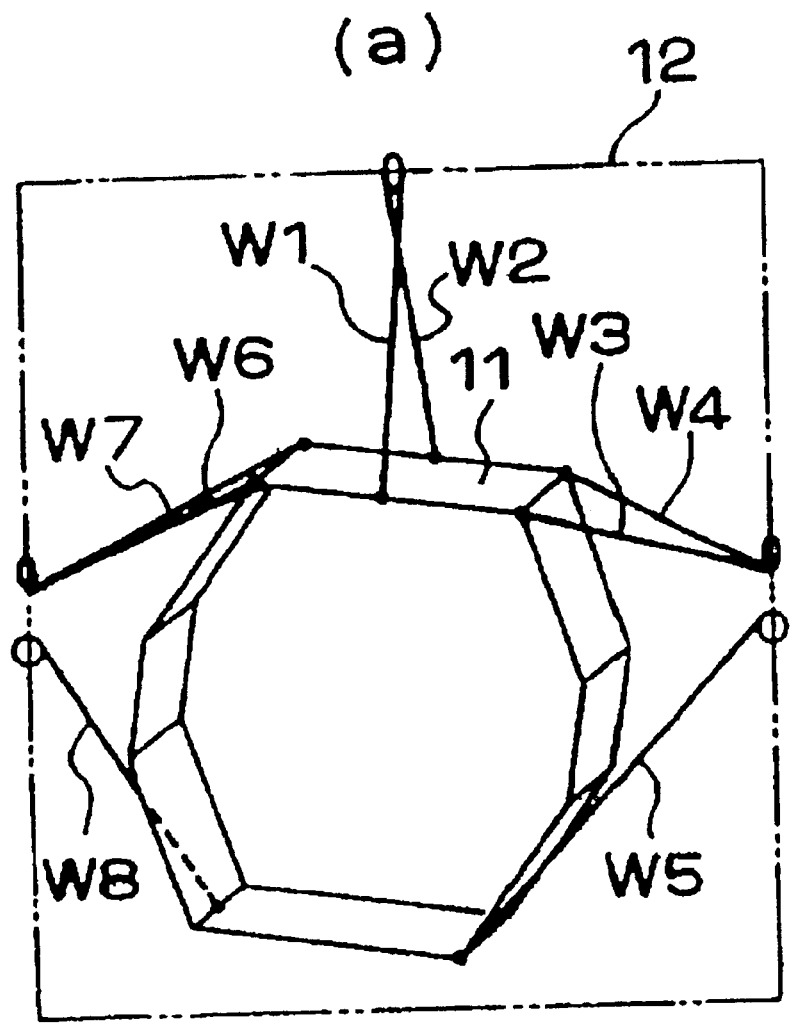
FIGS. 12(a)–(c) are schematic views of the bodily sensing machine when the cage takes an tilting attitude, (a) is a front view, (b) is a side view, and (c) is a plan view.
Figure 12B:
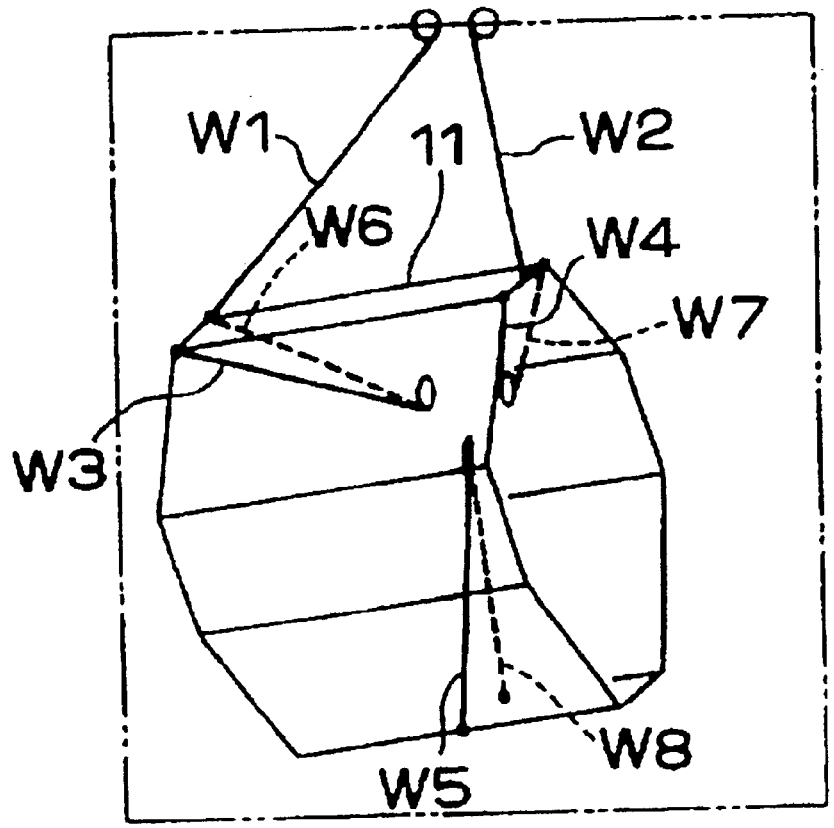
Figure 12C:
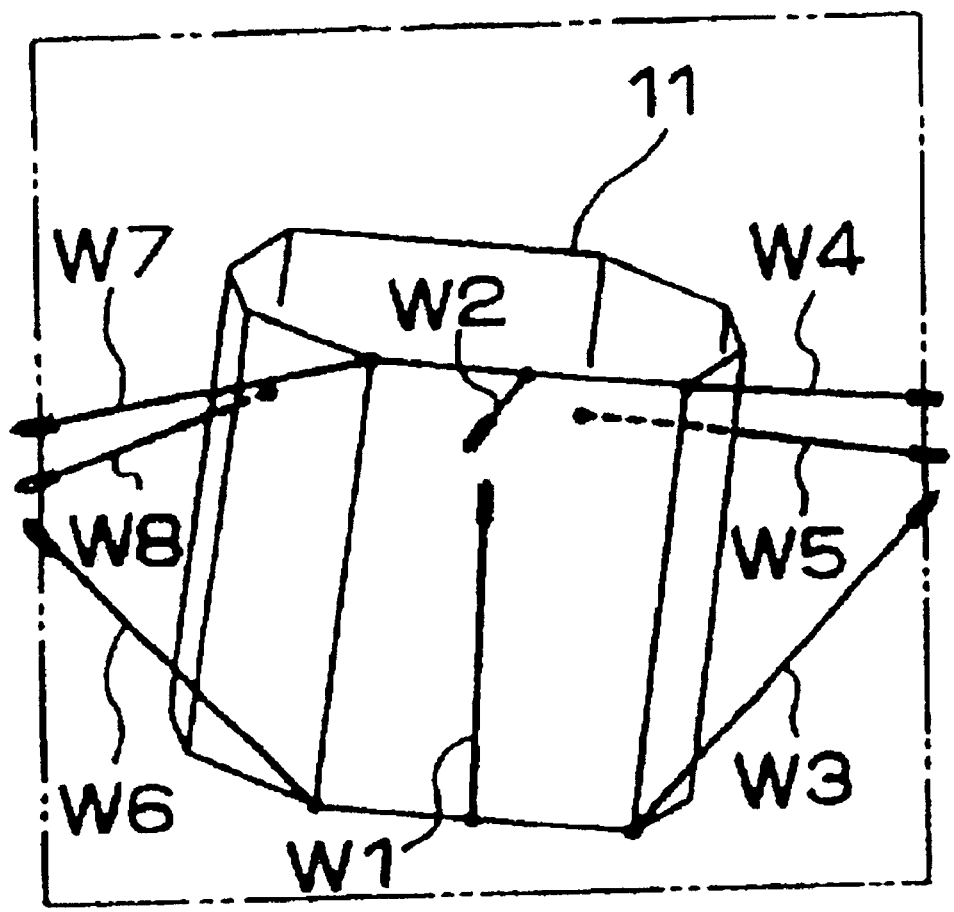

FIG. 11 shows the resulting position of cage 11 which has been shifted backwardly, downwardly and rightwardly from the original standstill position. This is the result that actuators 13 have been controlled by controller system 18 so that, with regard to tensions of eight wires W, right wires W3–W5 exceed left wires W6–W8, front wires W1, W3 and W6 exceed rear wires W2, W4 and W7, and lower wires W5 and W8 exceed upper wires W3, W4, W6 and W7. While each wire W can pull cage 11 but cannot push it, if left wire V6, for example, is veered out, antagonistic right wire W3 is hauled up, so that right wire W3 applies to cage 11 increased force and moment which are opposite to those of left wire W6, thereby enabling cage 11 to move efficiently. Due to the characteristics of symmetry in the arrangement of eight wires W, bodily sensing machine 1 provides each wire W with antagonistic wire W which applies reverse force and moment onto cage 11, thereby excellently moving cage 11 in six degrees of freedom.

Cage 11 can be translated from the original position shown in FIG. 10 so as to reach the position shown in FIG. 11. Otherwise, on the way between the both positions, cage may be rotated round any axis so as to be tilted. The acceleration and velocity of cage 11 is determined according to the installed program or according to the motion of operated joystick JS. While being veered out or hauled up by actuator 13 for moving cage 11, each wire W is constantly given a tension which is not less than the predetermined minimum, thereby being prevented from looseness.

In FIG. 11, cage 11 is located in the vicinity of the right, rear and bottom end surfaces of bodily sensing room 12, however, it can similarly approach the left, front and upper surfaces of bodily sensing room 12. In a 6-DOF travelling system using conventional serial or parallel link mechanism, its travelling object cannot be moved to such a distance because of the contact of links with one another. In bodily sensing machine 1, each of wires W in the present arrangement enables the limit positions of cage 11 to be farther from the original position in combination with the above-mentioned merit of the shape of cage 11.

Cage 11 can extremely approach the floor of bodily sensing room 12, so that the difference in height between the floors of cage 11 and bodily sensing room 12 can be diminished and vanished. Also, cage 11 can approach a door disposed at an optional portion of any side surface among front, rear, right and left surfaces of bodily sensing room 12. Thus, a rider can easily get on and off cage 11.

Cage 11 in suspension by eight wires W distributively collected to fixed points FP1–FP3 can be widely rotated at most positions without the contact of wires W with one another. Therefore, cage 11 can be easily tilted as shown in FIG. 12. If cage 11 is to be excitingly accelerated during its translation, a long straight distance should be required. Bodily sensing machine 1 has minimized bodily sensing room 12 and the arrangement of eight wires W as shown in FIGS. 1–3 which cannot effectively accelerate cage 11 in straight. However, since cage It is gravitationally accelerated for a rather long time in a small space during its tilting by its rotation round any axis, bodily sensing machine 1 is greatly exciting while being sufficiently compacted, thereby being appropriate to a flight simulator and other training or amusement machine which can be provided in a small space.

Bodily sensing system 1 is modifiable. Wires W may be replaced with other type lines like cables, ropes, chains and so on, which are not limited in their material. Cage 11, bodily sensing room 12, actuators 13 and pulley supporters 15, or other parts of bodily sensing machine 1 may be modified in construction, figure, dimension, material, number, means of fixture, means of connection, direction or order of motion and so on, without departing from the scope of the present invention.

If bodily sensing machine 1 is applied to a mobile machine for medical service or care, the arrangement of eight wires, pulleys as fixed points for collecting wires, positions of connection points on cage 11 and the shape of cage 11 should be modified so as to be suitable to translation of the cage.

Bodily sensing machine 1 described up to this point is an application of a 6-DOF travelling system having a solid as a human-riding cage in suspension by multiple (especially, eight) lines like wires.

Consideration will now be given on the number of wires for suspending the cage as follows:

Five wires cannot drive the cage in six degrees of freedom in principle. Six wires can drive the cage in six degrees of freedom with the help of gravity. However, the executable acceleration or angular acceleration of the cage is limited. For example, if the cage is suspended upwardly by six wires, the vertically downward acceleration of the cage cannot be more than that of gravity because the cage is not pushed but pulled by the wires.

The travelling system using seven wires has proved able to drive the cage in six degrees of freedom, in other words, to accelerate it straightly and rotationally in all directions. This function is essentially required to widen the travelling space where the rider in the cage can obtain a virtual reality.

However, the cage suspended and driven by seven wires is difficult to be widely rotated round all axes, to be given a large moment, and to be rotated at a large angular acceleration, because the cage sometimes becomes a singular point in mechanics in the center of its moving space, wherein the cage cannot be accelerated or given force or moment in some direction, they being hard to be controlled The singular point can be diminished by addition of one or more redundant wires. If the cage is driven by eight wires, it impossibly becomes the singular point in the center of the working space.

The redundancy by eight wires for driving the cage increases the variety of combination of tensions of wires provided for desired motion of the cage, thereby enhancing the option of motion of the cage. In this regard, for moving the cage desirably, only a few effective wires W of the eight (at least two wires W; one is veered out and the other is antagonistically hauled up so as to apply opposite forces and moments onto the cage) are required to be veered out or hauled up, thereby saving the rest of the eight actuators, so as to reduce the consumption of electric power. In other words, the 6-DOF travelling system using eight wires can give a greater acceleration or angular acceleration to its travelling object at the unit of electric power than that using seven wires.

However, the dynamic redundancy of eight wires W makes an over-constraint system. There arises the problem that, when a few optional wires are veered out and hauled up, the variations of their tensions are distributively applied onto the other wires as internal forces, thereby hindering the effective motion of the cage, and loosening any wire. The problem can be solved by such a manner that a total of force and moment to be applied on the cage is calculated from the analyses of the current motion and the objective motion of the cage and the calculated total is controlled so as to be distributed among the tensions generated by the wires. In presented bodily sensing machine 1, controller system 18 regulates the tensions of wires W by use of servo controllers 66.

Also, the redundancy of wires effects the expansion of the working space of the cage and the reduction of load on the wire. In this regard, bodily sensing machine 1 is designed so as to prevent its wires W from break. Even if one or a few wires W are broken by an irresistible force, cage 11 can be prevented from such a serious case as falling by the rest of wires W.

Furthermore, the cage driven by eight wires is supported more strongly than that by seven wires, so that its motion is stiffly modulated.

As the above-mentioned, various functions are greatly improved by use of eight wires which can be obtained by seven wires plus one redundant wire.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A six-degree-of-freedom travelling system provided with a solid serving as a travelling object having eight connection points; eight lines suspending said solid in connection with said respective eight connection points to be hauled up and veered out: and three fixed points for guiding said eight lines therethrough consisting of a top fixed point disposed above said solid, a right fixed point disposed rightward from said solid, and a left fixed point disposed leftward from said solid, wherein said right and left fixed points are laterally-symmetrically disposed with respect to said solid when said solid is originally positioned, and said eight connection points consisting of:

a first connection point and a second connection point disposed forward and backward on the top of said solid, two of said eight lines in connection with said respective first and second connection points being extended through said top fixed point;

a forward upper third connection point, a backward upper fourth connection point and a longitudinally-middle lower fifth connection point are disposed at rightward portions of said solid, so that said three rightward connection points are arranged so as to form an isosceles triangle with said fifth connection point as the bottom vertex thereof, three of said eight lines in connection with said respective third, fourth and fifth connection points being extended through said right fixed point; and a forward upper sixth connection point, a backward upper seventh connection point and a longitudinally-middle lower eighth connection point are disposed at leftward portions of said solid, so that said three leftward connection points are arranged so as to form a vertically-flapped isosceles triangle with said eighth connection point as the bottom vertex thereof, which is identical with said triangle shape made by said three rightward connection points, three of said eight lines in connection with said respective sixth, seventh and eighth connection points being extended through said left fixed point, wherein said third and sixth connection points are disposed laterally and symmetrically with respect to said first connection point, and said fourth and seventh connection points are disposed laterally and symmetrically with respect to said second connection point.

2. The six-degree-of-freedom travelling system as set forth in claim 1, wherein said solid has a longitudinally cylindrical body which is laterally symmetrically polygonal when viewed along the longitudinal direction of said solid.

3. The six-degree-of-freedom travelling system as set forth in claim 2, wherein said polygonal shape as the view of said solid along the longitudinal direction of said solid has a pair of originally-lateral top and bottom sides.

4. The six-degree-of-freedom travelling system as set forth in claim 3, wherein said polygonal shape is an octagon.

5. The six-degree-of-freedom travelling system as set forth in claim 3, wherein said solid has a pair of originally-vertical front and rear surfaces in said polygonal shapes, wherein said originally-lateral top side of said front surface is provided on its middle portion with said first connection point, on its right end with said third connection point and on its left end with said sixth connection point, and wherein said originally-lateral top side of said rear surface is provided on its middle portion with said second connection point, on its right end with said fourth connection point and on its left end with said seventh connection point.

6. The six-degree-of-freedom travelling system as set forth in claim 5, wherein an edge joining the right ends of said originally-lateral bottom sides of said front and rear surfaces is provided on its middle portion with said fifth connection point, and wherein an edge joining the left ends of said originally lateral bottom sides of said front and rear surfaces is provided on its middle portion with said eighth connection point.

7. The six-degree-of-freedom travelling system as set forth in claim 1, wherein said solid serving as a travelling object is a human riding cage.

\* \* \* \* \*